US012791501B2

(12) United States Patent
Eichmann et al.

(10) Patent No.: US 12,791,501 B2
(45) Date of Patent: Nov. 10, 2026

(54) USING PYROLYSIS DATA TO CORRECT FOR THE IMPACT OF SOLUBLE ORGANIC MATTER-FILLED PORES ON PROPERTY MEASUREMENTS USING SCANNING ELECTRON MICROSCOPY IMAGES OF SOURCE ROCKS

(71) Applicant: Saudi Arabian Oil Company, Dhahran (SA)

(72) Inventors: Shannon L. Eichmann, Katy, TX (US); David Jacobi, The Woodlands, TX (US); Poorna Srinivasan, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 1184 days.

(21) Appl. No.: 17/840,761

(22) Filed: Jun. 15, 2022

(65) Prior Publication Data

US 2023/0408429 A1 Dec. 21, 2023

(51) Int. Cl.
*G01N 23/2251* (2018.01)

(52) U.S. Cl.
CPC ... *G01N 23/2251* (2013.01); *G01N 2223/616* (2013.01); *G01N 2223/649* (2013.01)

(58) Field of Classification Search
CPC ......... G01N 23/2251; G01N 2223/616; G01N 2223/649
See application file for complete search history.

(56) References Cited

U.S. PATENT DOCUMENTS

| | | | | |
|---|---|---|---|---|
| 9,029,156 | B2 | 5/2015 | Kornacki et al. | |
| 9,599,551 | B2 | 3/2017 | Koroteev et al. | |
| 9,995,698 | B2 | 6/2018 | Suarez-Rivera et al. | |
| 10,012,765 | B2 | 7/2018 | Haas et al. | |
| 10,198,804 | B2 | 2/2019 | Sungkorn et al. | |
| 10,422,736 | B2 | 9/2019 | Walls et al. | |
| 10,698,131 | B2 | 6/2020 | Craddock et al. | |
| 10,816,452 | B2 | 10/2020 | Wang et al. | |
| 11,119,025 | B2 | 9/2021 | Saxena et al. | |
| 2012/0197526 | A1* | 8/2012 | Leyte Guerrero | G01N 23/04 250/311 |
| 2013/0094716 | A1* | 4/2013 | Carpio | G06T 7/38 382/109 |
| 2014/0052420 | A1 | 2/2014 | Cavanaugh | |
| 2015/0104078 | A1 | 4/2015 | Varslot et al. | |
| 2023/0366793 | A1* | 11/2023 | Eustaquio Lopes | E21B 49/00 |

OTHER PUBLICATIONS

SAIP Examination Report in Saudi Arabian Appln. No. 123447258, dated Apr. 29, 2025, 20 pages (with English translation).
Capsan et al., "Using core data, digital rocks, and source rock kinetics to reduce hydrocarbon storage uncertainty in unconventional reservoirs: application to south Texas organic rich mudstones," SPE/AAPG/SEG Unconventional Resources Technology Conference, OnePetro, 2016, 20 pages.

(Continued)

*Primary Examiner* — Manuel L Barbee
(74) *Attorney, Agent, or Firm* — Fish & Richardson P.C.

(57) ABSTRACT

A combination of scanning electron microscope data and pyrolysis data are used to correct for solid organic matter-containing pores in a source rock sample. The methods can yield corrected sample porosity estimates and/or kerogen content estimates.

17 Claims, 4 Drawing Sheets

(56) References Cited

OTHER PUBLICATIONS

Eichmann et al."Improved Nanoscale Image-based Reservoir Characterization using Supervised Machine Learning," Unconventional Resources Technology Conference, OnePetro, 2021, 14 pages.
Eichmann et al., "Quantitative Image Analysis of Source Rocks Using Machine Learning Segmentation," Microscopy and Microanalysis, 2020, 26(S2): 2862-2865, 4 pages.
Espitalié et al., "In Source rock characterization method for petroleum exploration," OTC-2935-MS, presented at the Offshore Technology Conference, 1977, 6 pages.
glossary.oilfield.slb.com [online] "Dean-Stark extraction," Sclumberger Oilfield Glossary, retrieved on May 3, 2022, retrieved from URL, <https://glossary.oilfield.slb.com/en/terms/d/dean-stark_extraction>, 2 pages.
glossary.oilfield.slb.com [online] "distillation extraction," Sclumberger Oilfield Glossary, retrieved on May 3, 2022, retrieved from URL, <https://glossary.oilfield.slb.com/en/terms/d/distillation_extraction>, 2 pages.
Luffel et al., "New core analysis methods for measuring reservoir rock properties of Devonian Shale," Journal of Petroleum Technology, Nov. 1992, 44(11):1184, 7 pages.
McCarthy et al.: "Basic petroleum geochemistry for source rock evaluation," Oilfield Review, 2011, 23(2), 32-43, 12 pages.
Mishra et al., "Micro Porosity within the Organic Matter and its Impact on Assessment of Unconventional Potential of a Kerogen Rich Najmah Formation in Kuwait," SPE-197507-MS, Abu Dhabi International Petroleum Exhibition & Conference, OnePetro, 2019, 14 pages.
Sanei, "Genesis of solid bitumen," Scientific Reports, 2020, 10(1):1-10, 10 pages.
Schlüter et al., "Image processing of multiphase images obtained via X-ray microtomography: a review," Water Resources Research 2014, 50(4):3615-3639, 70 pages.
Sinha, "Surface Area Study in Organic Rich Shales using Nitrogen Adsorption," A Thesis Submitted to the Graduate Faculty in partial fulfillment of the requirements for the degree of Master of Science, 2017, 144 pages.

* cited by examiner

USING PYROLYSIS DATA TO CORRECT FOR THE IMPACT OF SOLUBLE ORGANIC MATTER-FILLED PORES ON PROPERTY MEASUREMENTS USING SCANNING ELECTRON MICROSCOPY IMAGES OF SOURCE ROCKS

FIELD

The disclosure relates to methods of using pyrolysis data to correct for the impact of soluble organic matter (SOM)-filled pores on property measurements using scanning electron microscopy (SEM) images of source rocks. In some embodiments, the methods involve porosity estimates and/or kerogen content estimates.

BACKGROUND

Quantifying the porosity and kerogen content of a source rock can be useful in exploration and production. It is known to use SEM images or pyrolysis data to gain knowledge about certain aspects of the source rock.

SUMMARY

The disclosure relates to methods of using pyrolysis data to correct for SOM-filled pores in SEM images of source rocks.

As an example, in some cases, it is desirable to know the porosity of a source rock sample that has some pores filled with soluble organic matter. Soluble organic matter (SOM) refers to organic matter, which can be pore occluding residual hydrocarbons (i.e., $C_{15+}$) that are soluble in organic solvents and/or certain gases (e.g., $CO_2$) and which can be removed by various cleaning processes. An SEM image of the sample may show the organic matter without being able to distinguish the SOM present in pores. The disclosure presents a quantitative method to correct for SOM-filled pores during the processing of SEM images to provide a more accurate measurement of the porosity of the sample and/or a more accurate depiction of the kerogen content of the sample. Examples of organic content observed in SEM images of source rocks include kerogen, pore occluding fluids (i.e., SOM), bitumen (e.g., residual bitumen content, solid bitumen content), and/or pyrobitumen.

In some embodiments, the methods can take into account potential complications that may result from cleaning a sample with a solvent before analyzing the sample using pyrolysis. In certain embodiments, the methods can be performed without multiple imaging and/or solvent extraction steps. In some embodiments, the methods can provide enhanced information in the study of rock structures, such as those having significant heterogeneity. In certain embodiments, the methods can be used in quality assessment and/or petrophysical model development. In some embodiments, the methods can be used to obtain a porosity and/or kerogen content estimate in an unconventional reservoir (e.g., shales, tight sands, mudrocks). In some embodiments, the methods can be used to obtain porosity and/or kerogen content estimates that can be compared to results obtained using a different analytical technique, such as the Gas Research Institute method (GRI) method, pyrolysis, or petrophysical logs. In certain embodiments, the methods involve porosity estimates and/or kerogen content estimates.

In some embodiments, the SEM imaging is two-dimensional scanning electron microscopy (2D SEM) or three-dimensional focused ion beam scanning electron microscopy (3D FIB-SEM). In some embodiments, the SEM images can be collected on rock pieces from the end of a plug or from a whole core or from large cuttings samples.

In a first aspect, the disclosure provides a method of determining an adjusted porosity of a source rock sample, wherein the source rock sample includes pores that include soluble organic matter (SOM). The method includes using pyrolysis data for the source rock sample to correct the porosity data obtained from a scanning electron microscopy image of the source rock sample ($\phi_{SEM}$) to determine the adjusted porosity ($\phi_{Adj\ SEM}$) of the source rock sample, wherein the pyrolysis data includes at least one member selected from the group consisting of a volume productivity index ($PI_{vol}$) of the source rock sample and a corrected volume productivity index ($PI\_corr_{vol}$) of the source rock sample.

In some embodiments, before obtaining the pyrolysis data, the source rock sample is not cleaned using a solvent, and the pyrolysis data includes $PI_{vol}$.

In some embodiments, $$PI_{vol} = \frac{PI_{mass}/\rho_{SOM}}{(PI_{mass}/\rho_{SOM}) + ((1 - PI_{mass})/\rho_k)}$$

where $PI_{mass}$ is the productivity index, $\rho_{SOM}$ is the SOM density, and $\rho_k$ is the kerogen density.

In some embodiments, $$\phi_{Adj\,SEM} = \%_{org,SEM} * PI_{vol} + \phi_{SEM} + A$$

where $\%_{org,SEM}$ is an organic matter content calculated from the SEM image, $\phi_{SEM}$ is a porosity determined from the SEM image, and A is a correction factor.

In some embodiments, before obtaining the pyrolysis data, the source rock sample is cleaned using a solvent, and the pyrolysis data include $PI\_corr_{vol}$. In some embodiments, $$\text{PI\_corr}_{vol} = \frac{\text{PI\_corr}_{mass}/\rho_{SOM}}{(\text{PI\_corr}_{mass}/\rho_{SOM}) + ((1 - \text{PI\_corr}_{mass})/\rho_k)}$$

where $PI\_corr_{mass}$=−0.156×LN(HI)+1.104, HI is the hydrogen index, $\rho_{SOM}$ is the SOM density, and $\rho_k$ is kerogen density.

In some embodiments.

$$\phi_{Adj\,SEM} = \%_{org,SEM} * \text{PI\_corr}_{vol} + \phi_{SEM} + A$$

where $\%_{org,SEM}$ is an organic matter content calculated from the SEM image, $\phi_{SEM}$ is a porosity determined from the SEM image, and A is a correction factor.

In some embodiments, the source rock sample includes a first subsample and a second subsample, the SEM image of the source rock sample is obtained from the first subsample, and the pyrolysis data are obtained from the second subsample.

A second aspect, the disclosure provides a method of determining an adjusted amount of organic matter from a scanning electron microscopy image of a source rock sample, wherein the source rock sample includes pores that include soluble organic matter (SOM). The method includes using pyrolysis data for the source rock sample to correct the organic matter percentage obtained from a scanning electron microscopy image of the source rock sample to determine the adjusted amount of organic matter ($\%_{AdjOrg,SEM}$) in the source rock sample, wherein the pyrolysis data includes at least one member selected from the group consisting of a volume productivity index ($PI_{vol}$) of the source rock sample and a corrected volume productivity index ($PI\_corr_{vol}$) of the source rock sample.

In certain embodiments, before obtaining the pyrolysis data, the source rock sample is not cleaned using a solvent, and the pyrolysis data include $PI_{vol}$.

In certain embodiments, $$PI_{vol} = \frac{PI_{mass}/\rho_{SOM}}{(PI_{mass}/\rho_{SOM}) + ((1 - PI_{mass})/\rho_k)}$$

where $PI_{mass}$ is the productivity index, $\rho_{SOM}$ is the SOM density, and $\rho_k$ is kerogen density. In certain embodiments, $$\%_{AdjOrg,SEM} = \%_{org,SEM}(1 - PI_{vol})$$

where $\%_{org,SEM}$ is an organic matter content calculated from the SEM image.

In certain embodiments, before obtaining the pyrolysis data, the source rock sample is cleaned using a solvent, and the pyrolysis data include $PI\_corr_{vol}$.

In certain embodiments, $$PI\_corr_{vol} = \frac{PI\_corr_{mass}/\rho_{SOM}}{(PI\_corr_{mass}/\rho_{SOM}) + ((1 - PI\_corr_{mass})/\rho_k)}$$

where $PI\_corr_{mass}$=−0.156×LN(HI)+1.104, HI is the hydrogen index, $\rho_{SOM}$ is the SOM density, and $\rho_k$ is the kerogen density. In certain embodiments, $$\%_{AdjOrg,SEM} = \%_{org,SEM}(1 - PI_{corr_{vol}})$$

where $\%_{org,SEM}$ is an organic matter content calculated from the SEM image.

In certain embodiments, the source rock sample includes a first subsample and a second subsample, the SEM image of the source rock sample is obtained from the first subsample, and the pyrolysis data are obtained from the second subsample.

In a third aspect, the disclosure provides one or more machine-readable hardware storage devices including instructions that are executable by one or more processing devices to perform operations of a method of determining an adjusted porosity of a source rock sample as disclosed herein.

In a fourth aspect, the disclosure provides a system including one or more processing devices, and one or more machine-readable hardware storage devices with instructions that are executable by the one or more processing devices to perform operations of a method of determining an adjusted porosity of a source rock sample as disclosed herein.

DETAILED DESCRIPTION

Figure 1:
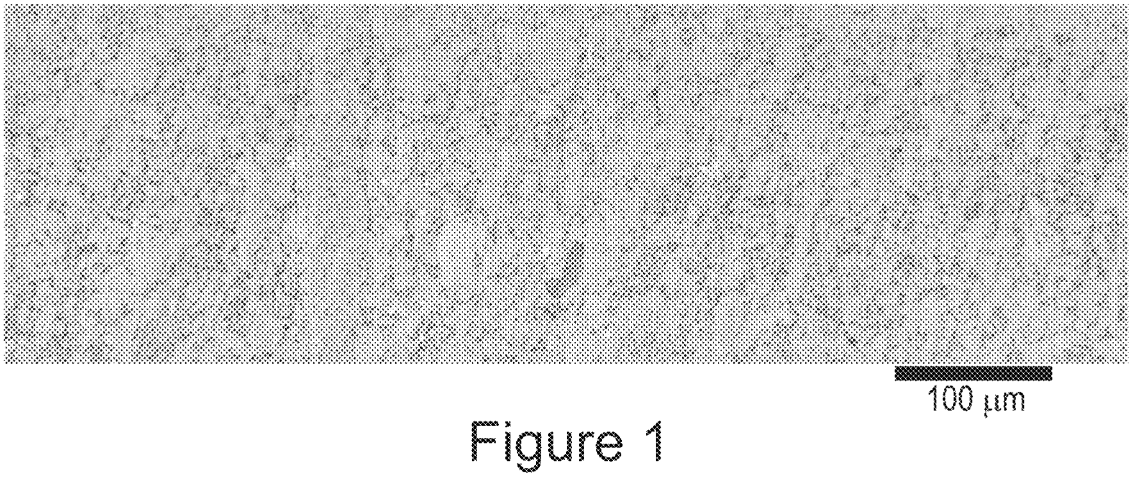
FIG. 1 is a SEM image.

In pyrolysis, a crushed, source rock sample is introduced to an oven where it is heated under an increasing temperature ramp from 300-600° C. and the volatiles evolved are measured via a flame ionization detector (FID). At the lower end of the temperature spectrum around 330° C., the distilled organic matter from the rock (SOM, i.e., residual hydrocarbons, bitumen, and/or solid bitumen) are measured as S1 in mg hydrocarbon/gm rock. At around 600° C. another volatile is collected, S2, in mg hydrocarbon/gm rock that represents the generative potential of the remaining organic matter left in the rock (i.e., kerogen). The maximum temperature reached from pyrolyzing the sample is also recorded via this S2 peak. In non-cleaned samples, both the S1 and S2 values are used to determine a productivity index, $PI_{mass}$ (Equation 1).

$$PI_{mass} = S1/(S1 + S2) \quad (1)$$

This equation is related to the fraction of the original kerogen in the rock that has been converted into mobile, free hydrocarbons (SOM, i.e., residual hydrocarbons, bitumen and/or solid bitumen) which is a measure of maturity. For context, the following relationship between $PI_{mass}$ value and degree of maturity is sometimes used. $PI_{mass}$ of 0.1 corresponds to early oil maturity, $PI_{mass}$ of 0.25 corresponds to peak maturity, and $PI_{mass}$ of 0.4 or greater corresponds to condensate maturity.

In certain embodiments, a source rock sample received for pyrolysis is already cleaned with a solvent (e.g., toluene, methanol, xylene, chloroform) before pyrolysis. In certain embodiments, a source rock sample is cleaned with several solvents in sequence. In general, SOM (i.e., $C_{15+}$), is composed of long chain hydrocarbons and is soluble in such solvents, whereas kerogen is not soluble in such solvents. Therefore, certain sample cleaning procedures and other chemical treatments can remove SOM from the sample before the sample is subjected to pyrolysis. As a result, in such embodiments, the S1 value measured may not be correct. In certain embodiments, samples may naturally lose SOM (i.e., S1) due to volatility.

Hydrocarbon transformation occurs due to a loss of hydrogen relative to carbon within the kerogen, which can be emulated by calculating the hydrogen index (HI), which is the ratio of S2 to the total organic carbon (TOC) content provided from pyrolysis (Equation 2).

$$HI = S2/TOC \times 100 \quad (2)$$

In general, the change in the HI is not significantly affected by the solvent cleaning process due to the fact that kerogen (i.e., S2) is not soluble in organic solvents. Therefore, HI is diagnostic of the maturity of the source rock similar to that computed from the $PI_{mass}$. For context, the following relationship between HI value and degree of maturity is sometimes used. HI greater than 450 mg HC/g TOC is considered as immature, HI of 450 mg HC/g TOC is considered as early oil maturity, HI of 300 mg HC/g TOC is considered as peak oil maturity, HI of 150 mg HC/g TOC is considered as late oil maturity, HI of 100 mg HC/g TOC is considered as condensate and wet gas maturity, and HI of 50 mg HC/g TOC is considered as dry gas maturity. Thus, while PI generally increases with maturity, HI generally declines with maturity. A relationship between PI and HI can be developed using a series of non-cleaned source rock samples ranging in maturity from immature to condensate maturity. This relationship can be used to obtain the mass fraction corrected PI ($PI\_corr_{mass}$) for cleaned samples using Equation 3.

$$PI\_corr_{mass} = -0.156 \times LN(HI) + 1.104 \tag{3}$$

If desired, $PI\_corr_{mass}$ and S2 measured from pyrolysis can provide an adjusted S1_corr for samples that were solvent cleaned prior to pyrolysis by substituting $PI\_corr_{mass}$ and S2 into Equation 1.

Generally, the methods of the disclosure can use $PI_{mass}$ (Equation 1) or $PI\_corr_{mass}$ (Equation 3) obtained from pyrolysis to estimate the fraction of SOM relative to total organic matter in a source rock sample. The porosity and organic matter of a source rock sample determined from SEM images can be corrected to estimate solvent-cleaned porosity (SOM-adjusted porosity) and solvent-cleaned organic matter (SOM-adjusted organic content; i.e., kerogen content) in source rocks.

In general, the methods of the disclosure include SEM imaging. In some embodiments, a sample for SEM imaging is cut from a larger sample, mechanically polished and ion milled prior to imaging. In some embodiments, the SEM images are selected from small field of view (FOV) 2D images, high resolution large FOV (LgFOV) stitched images, and 3D image volumes.

In some embodiments, an SEM image can be segmented to identify and label component groups present in the image. In some embodiments, the segmenting method is selected from intensity-based thresholding, gradient thresholding, watershed, and machine learning methods. In certain embodiments, the segmenting method uses at least one of intensity of the image pixel, local intensity variations or gradients, and paired components. In some embodiments, the segmenting can label different phases. In some embodiments, the phases can include pores, organics (including SOM, kerogen, and pyrobitumen), high-density minerals, fractures, and matrix minerals.

Generally, SOM, pyrobitumen, and kerogen are of similar gray-scale intensity and are thus all segmented as organic matter. In such images, the pores filled with SOM may be segmented and included in the organic matter fraction rather than the porosity fraction.

The percentage of each phase, $V_i$, can be calculated for each segmented image from the number of pixels (or voxels for 3D) assigned to each phase, $N_i$, and the total number of pixels (or voxels), $N_t$, using the following equation.

$$V_i = 100 * \frac{N_i}{N_t} \tag{4}$$

For example, when the phase is the organic matter ($V_i = \%_{org,SEM}$), the percentage of the organic matter can be calculated from the total number of pixels (or voxels for 3D) labeled as organic matter relative to the total number of pixels (or voxels) in the image.

In general, the pores in an SEM image of a source rock sample are a different gray-scale, shape, and size than the organic matter. The porosity ($\phi_{SEM}$) of the source rock sample from an SEM image is given by the following equation, where $N_p$ is the number of pixels assigned to pores and $N_t$ is the total number of pixels.

$$\phi_{SEM} = 100 * \frac{N_p}{N_t} \tag{5}$$

The methods of the disclosure can include performing pyrolysis to obtain the total organic carbon (TOC) content the hydrogen index (HI), and the productivity index ($PI_{mass}$ and/or $PI\_corr_{mass}$). In some embodiments, a source rock sample for pyrolysis is not cleaned using a solvent prior to pyrolysis. In certain embodiments, a sample for pyrolysis is cleaned using a solvent prior to pyrolysis. Generally, for a given source rock, the source rock sample used for pyrolysis is collected in a similar area as the source rock sample used for SEM imaging for improved data alignment given the heterogeneity of these samples.

In embodiments where the samples are non-cleaned, a separate, larger sample may be crushed to, for example, less than 500 micrometers (μm) for pyrolysis techniques. As an example, 60-100 mg of the crushed sample may then be weighed, placed in a crucible, and introduced to an oven where it is heated under an increasing temperature ramp from 300-600° C. and the volatiles evolved are measured via a flame ionization detector (FID). At the lower end of the temperature spectrum around 330° C., the distilled hydrocarbons from the rock (i.e., the SOM) can be measured as S1 in mg hydrocarbon/gm rock and at around 600° C. another volatile can be collected, S2, in mg hydrocarbon/gm rock that represents the remaining generative potential of the rock (i.e., the kerogen). The maximum temperature from the pyrolysis of the sample is also obtained via this S2 peak. In non-cleaned samples, both the S1 and S2 values can be used to determine a productivity index, $PI_{mass}$, according to Equation 1.

For each sample, the $PI_{mass}$ can be converted to volume fraction, $PI_{vol}$ based on the density of each component using the following equation.

$$PI_{vol} = \frac{PI_{mass}/\rho_{SOM}}{(PI_{mass}/\rho_{SOM}) + ((1 - PI_{mass})/\rho_k)} \tag{6a}$$

where $\rho_{SOM}$ is the SOM density and $\rho_{SOM}$=0.7-0.8 g/cc and $\rho_k$ is the kerogen density and $\rho_k$=1.1-1.3 g/cc.

In embodiments where the samples are cleaned using a solvent, between 60-100 mg of crushed, cleaned rock sample may be introduced to the pyrolysis oven and the data collection procedure for S1 and S2 are the same as described above. However, the S1 value measured (representing the SOM) may no longer be correct. Hydrocarbon transformation occurs due to a loss of hydrogen relative to carbon within the kerogen, which can be emulated by calculating the hydrogen index (HI) according to Equation 2.

For each sample, the $PI\_corr_{mass}$ may be converted to a volume fraction, $PI\_corr_{vol}$, based on the density of each component using the following equation.

$$PI\_corr_{vol} = \frac{PI\_corr_{mass}/\rho_{SOM}}{(PI\_corr_{mass}/\rho_{SOM}) + ((1 - PI\_corr_{mass})/\rho_k)} \tag{6b}$$

where $\rho_{SOM}$ and where $\rho_k$ are the densities as described above.

For cleaned pyrolysis samples but non-cleaned SEM samples, the organic matter (kerogen, SOM, and pyrobitumen) content calculated from the SEM image ($\%_{org,SEM}$) can be multiplied by $PI\_corr_{vol}$ to provide the amount of SOM-filled porosity that would be removed during solvent cleaning. By adding this amount to the porosity calculated from quantitative image processing on non-cleaned SEM samples using Equation 5, the SOM-corrected porosity ($\phi_{AdjSEM}$) can be calculated according to Equation 7a.

$$\phi_{Adj\,SEM} = \%_{org,SEM} * PI\_corr_{vol} + \phi_{SEM} + A \tag{7a}$$

where A is a correction factor for comparison to GRI porosity measurements to account for additional porosity induced during the crushing and sieving process. The correction factor (A) is related to the organic content determined from the SEM image ($\%_{org,SEM}$). Typically, A is 2 for $\%_{org,SEM}<10\%$, A is 1 for $10\%\leq\%_{org,SEM}\leq15\%$, and A is 0 for $\%_{org,SEM}>15\%$ . When the rock has relatively little organic content (i.e., $\%_{org,SEM}<10\%$) it may become more brittle and likely has more induced porosity due to the crushing process from GRI thus a higher correction factor is needed compared to samples with relatively high organic content (i.e., $\%_{org,SEM}>15\%$) where the induced porosity from crushing for GRI is likely negligible. In general, A is closer to zero when fracturing during crushing is not expected.

For non-cleaned pyrolysis and SEM samples, the organic matter (kerogen, SOM, and pyrobitumen) content calculated from the SEM image ($\%_{org,SEM}$) can be multiplied by $PI_{vol}$ to provide the amount of SOM-filled porosity that would be removed during solvent cleaning. By adding this amount to the porosity calculated from quantitative image processing on non-cleaned SEM samples using Equation 5, the SOM-corrected porosity ($\phi_{AdjSEM}$) can be calculated according to Equation 7b.

$$\phi_{Adj\,SEM} = \%_{org,SEM} * PI_{vol} + \phi_{SEM} + A \tag{7b}$$

where A is the sample correction factor as described above.

For cleaned pyrolysis samples but non-cleaned SEM samples, the amount of organic matter in the SEM image ($\%_{org,SEM}$) can be corrected using Equation 8a to provide an adjusted SEM organic content ($\%_{AdjOrg,SEM}$) (a measure of kerogen content) using the pyrolysis data.

$$\%_{AdjOrg,SEM} = \%_{org,SEM}(1 - PI_{corr_{vol}}) \tag{8a}$$

For non-cleaned pyrolysis and SEM samples, the amount of organic matter in the SEM image ($\%_{org,SEM}$) can be corrected using Equation 8b to provide an adjusted SEM organic content ($\%_{AdjOrg,SEM}$) (a measure of kerogen content) using the pyrolysis data.

$$\%_{AdjOrg,SEM} = \%_{org,SEM}(1 - PI_{vol}) \tag{8b}$$

Figure 6:
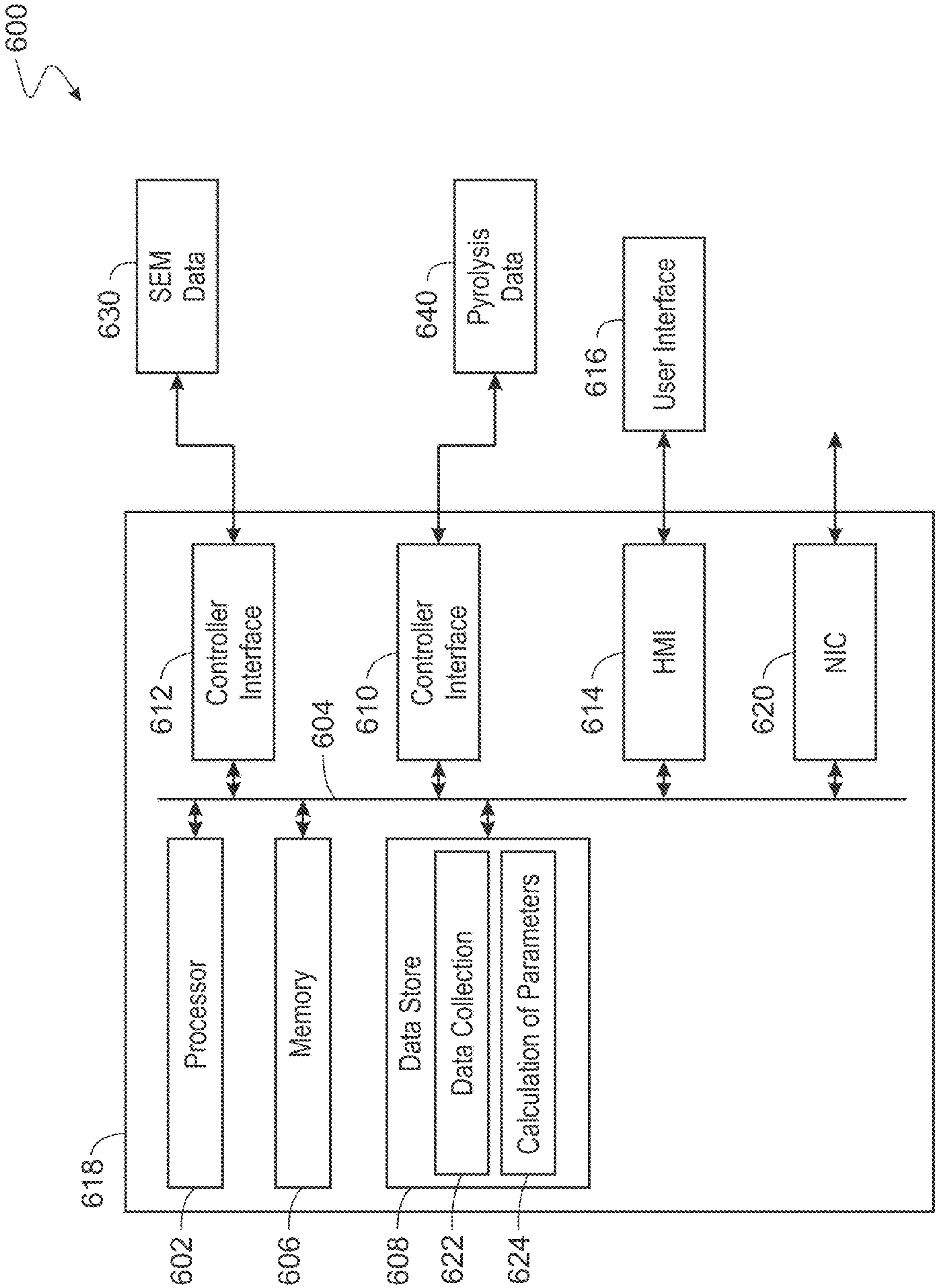
FIG. 6 is a block diagram of a system.

FIG. 6 is a block diagram of a controller 600 for controlling a method disclosed herein. The controller 600 may be used to provide more robust process control and higher efficiency.

In some embodiments, the controller 600 may be a separate unit mounted in the field or plant, such as a programmable logic controller (PLC), for example, as part of a supervisory control and data acquisition (SCADA) or Fieldbus network. In certain embodiments, the controller 600 may interface to a distributed control system (DCS) installed in a central control center. In some embodiments, the controller 600 may be a virtual controller running on a processor in a DCS, on a virtual processor in a cloud server, or using other real or virtual processors.

The controller 600 includes a processor 602. The processor 602 may be a microprocessor, a multi-core processor, a multithreaded processor, an ultra-low-voltage processor, an embedded processor, or a virtual processor. The processor 602 may be part of a system-on-a-chip (SoC) in which the processor 602 and other components are formed into a single integrated package. In various embodiments, the processor 602 may include processors from Intel® Corporation of Santa Clara, California, from Advanced Micro Devices, Inc. (AMD) of Sunnyvale, California, or from ARM holdings, LTD., of Cambridge England. Any number of other processors from other suppliers may also be used.

The processor 602 may communicate with other components of the controller 600 over a bus 604. The bus 604 may include any number of technologies, such as industry standard architecture (ISA), extended ISA (EISA), peripheral component interconnect (PCI), peripheral component interconnect extended (PCIx), PCI express (PCIe), or any number of other technologies. The bus 604 may be a proprietary bus, for example, used in a SoC based system. Other bus technologies may be used, in addition to, or instead of, the technologies above. For example, plant interface systems may include I2C buses, serial peripheral interface (SPI) buses, Fieldbus, and the like.

The bus 604 may couple the processor 602 to a memory 606. In some embodiments, such as in PLCs and other process control units, the memory 606 is integrated with a data store 608 used for long-term storage of programs and data. The memory 606 includes any number of volatile and nonvolatile memory devices, such as volatile random-access memory (RAM), static random-access memory (SRAM), flash memory, and the like. In smaller devices, such as PLCs, the memory 606 may include registers associated with the processor itself. The data store 608 is used for the persistent storage of information, such as data, applications, operating systems, and so forth. The data store 608 may be a non-volatile RAM, a solid-state disk drive, or a flash drive, among others. In some embodiments, the data store 608 will include a hard disk drive, such as a micro hard disk drive, a regular hard disk drive, or an array of hard disk drives, for example, associated with a DCS or a cloud server.

The bus 604 couples the controller 600 to a controller interface 610. The controller interface 610 may be an interface to a plant bus, such as a Fieldbus, an I2C bus, an SPI bus, and the like. The controller interface 610 couples the controller 600 to an oven and FID to provide pyrolysis data 640.

A controller interface 612 couples the controller 600 to a scanning electron microscope to provide SEM image data 630. The interface 612 may be an interface to a plant bus, such as a Fieldbus, an I2C bus, an SPI bus, and the like.

If the controller 600 is located in the field, a local human machine interface (HMI) 614 may be used to input control parameters. The local HMI 614 may be coupled to a user interface 616, including, for example, a display that includes a multiline LCD display, or a display screen, among others. The user interface 616 may also include a keypad for the entry of control parameters, such as the starting parameters for the flow of the lean solvent into the contactor. Generally, the controller 600 will either be part of a plant control system, such as a DCS, or coupled through a plant bus system to the plant control system.

In some embodiments, the controller 600 is linked to a control system for the assay through a network interface controller (NIC) 620. The NIC 620 can be an Ethernet interface, a wireless network interface, or a plant bus interface, such as Fieldbus.

The data store 608 includes blocks of stored instructions that, when executed, direct the processor 602 to implement the control functions for the assay. The data store 608 includes a block 622 of instructions to direct the processor to collect data through the interface 612.

The data store 608 also includes a block 624 of instructions to direct the processor to calculate one or more parameters from the SEM image data 630 and/or pyrolysis 640. Any number of blocks may be included in the data store 608 to implement of the various functions and/or steps of the assay disclosed herein. Such blocks can be used individually or in combination as appropriate.

EXAMPLES

Example 1: Comparison of Porosity Measurements

Example 1A—Cleaned Pyrolysis Samples with Non-Cleaned SEM Samples

GRI porosity ($\phi_{GRI}$) was measured on crushed and solvent cleaned source rock samples. SEM porosity ($\phi_{SEM}$) and SEM adjusted porosity ($\phi_{Adj\ SEM}$) were measured on samples without solvent cleaning (non-cleaned) collected at the same time, and from similar locations on the core.

Figure 2:
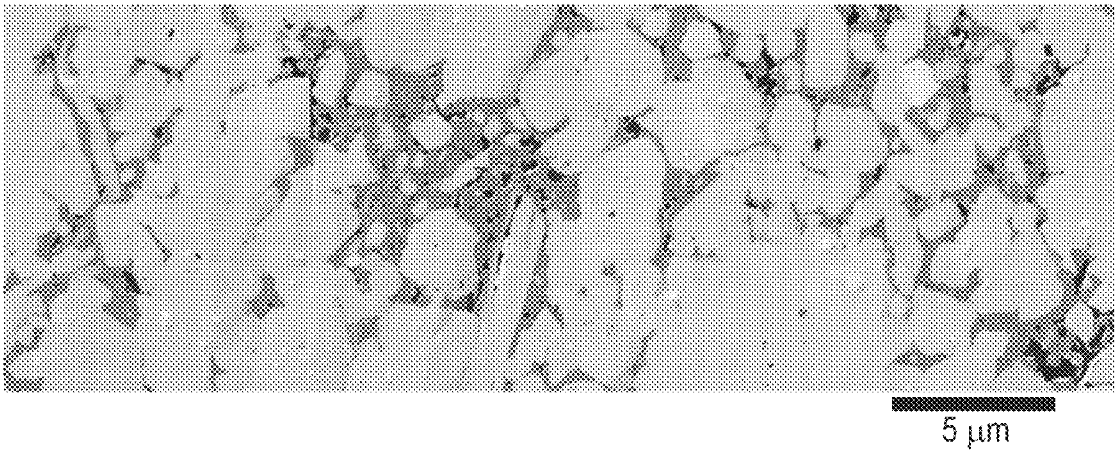
FIG. 2 is a SEM image.

SEM samples were cut from a larger sample, mechanically polished, ion milled, and then imaged on a Zeiss SEM. A single LgFOV image was collected by stitching a large number of adjacent secondary electron images. FIG. 1 shows an example LgFOV image (80 tiles, 4096 pixels×4096 pixels/tile, collected at 12 nm/pixel which were overlaid, stitched and exported at 15 nm/pixel to generate an image of 725 μm×224 μm) showing pores in black, organic matter (kerogen, SOM, and pyrobitumen) in dark gray, high density minerals in white, and matrix minerals in light gray. FIG. 2 is a zoom in of a region from the LgFOV 2D image of FIG. 1 showing matrix minerals, pores black, organic matter (kerogen, SOM, and pyrobitumen) in dark gray, and matrix minerals in light gray.

In this example, SEM images were segmented using a supervised machine learning method and the SEM porosity ($\phi_{SEM}$) was determined as described above.

The samples used for pyrolysis measurements were received after cleaning by a Dean Stark method. 60-100 mg of crushed, cleaned rock sample was introduced to a pyrolysis oven where it was heated under an increasing temperature ramp from 300-600° C. and the volatiles evolved were measured via a flame ionization detector (FID) to obtain S1 and S2. The hydrogen index (HI) was calculated according to Equation 2.

$PI\_corr_{mass}$ was measured from the HI values obtained from cleaned samples as shown in Equation 3 and subsequently converted to $PI\_corr_{vol}$. The adjusted SEM porosity ($\phi_{Adj\ SEM}$) was determined using Equation 7a.

GRI porosity (d)GRI) was determined using a GRI technique as described previously (Luffel, D L & Guidry F K, (1992); GRI final report: GRI-95/0496). The bulk density ($\rho_b$) of a rock sample was first measured. The rock was then crushed to powder, sieved, and cleaned using a Dean Stark method to measure fluid saturations ($S_o$—oil, $S_w$—water, and $S_g$—gas), the fluid density ($\rho_f$) was calculated, and the grain volume was measured by Boyle's law to obtain the grain density ($\rho_g$). The solvents used in the cleaning process, however, can damage kerogen or extract bitumen causing the porosity measured by GRI ($\phi_{GRI}$) to be different from the $\phi_{SEM}$.

Figure 3:
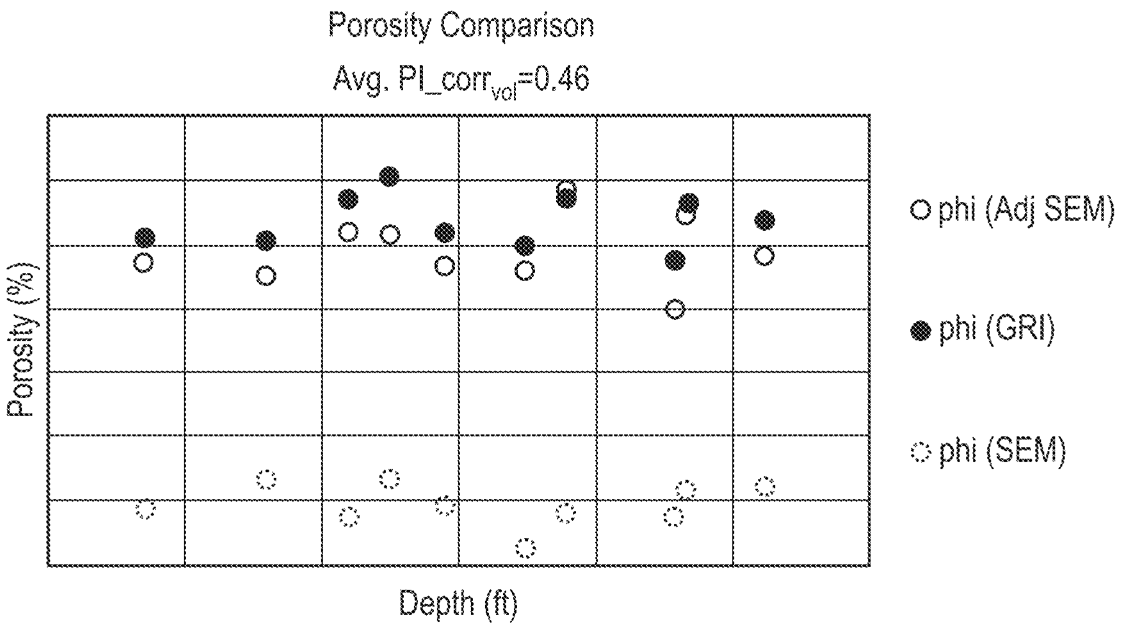
FIG. 3 is a graph comparing porosity values.

FIG. 3 shows relative porosity measurements determined using the three methods described above for ten samples in the oil maturity window taken from different depths. The separation between the $\phi_{GRI}$ and the $\phi_{SEM}$ was relatively large. However, using the value of $PI\_corr_{vol}$ calculated from pyrolysis data using the equations provided above on each of the 10 samples (average value for $PI\_corr_{vol}$ of 0.46) and values for the sample correction factor, A, of 1, 1, 0, 0, 1, 0, 0, 2, 0, and 1 for the ten samples from left to right, the SOM-corrected SEM porosity ($\phi_{Adj\ SEM}$) was more consistent with the $\phi_{GRI}$ measured on crushed, cleaned, and dried samples compared with the uncorrected SEM porosity ($\phi_{SEM}$).

Thus, FIG. 3 lends credence to the appropriateness of the methods disclosed herein for correcting of non-cleaned rock samples for SEM imaging having SOM-containing pores using pyrolysis data from cleaned rock samples.

Example 1B—Non-Cleaned Pyrolysis and Non-Cleaned SEM Samples

Figure 4:
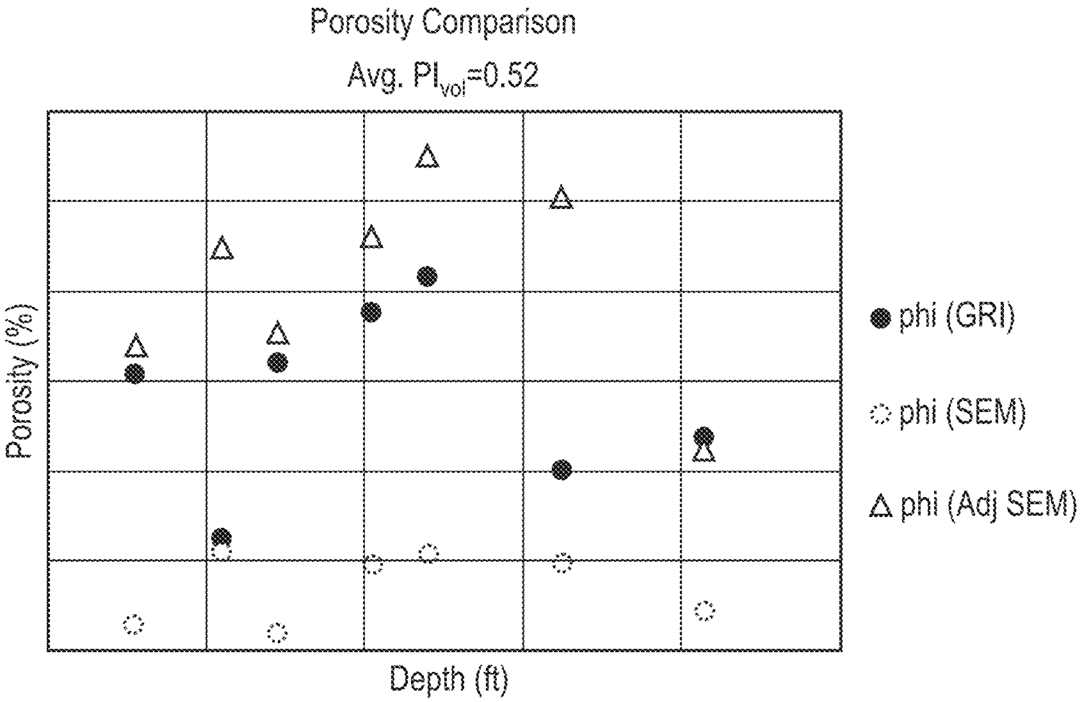
FIG. 4 is a graph comparing porosity values.

FIG. 4 shows relative porosity measurements for seven samples in the gas maturity window, which are more mature than those from the oil maturity window shown in FIG. 3, taken from different depths. SEM and GRI measurements were performed using the methods described in Example 1A.

The samples used for pyrolysis were not cleaned prior to measurement. A separate, larger sample was crushed to <500 μm for pyrolysis. 60-100 mg of the crushed sample was then weighed, placed in a crucible, and introduced to an oven where it was heated under an increasing temperature ramp from 300-600° C. and the volatiles evolved were measured via a flame ionization detector (FID). The S1 and S2 values were used to determine a productivity index, PI, according to Equation 1.

For each sample, the $PI_{mass}$ was converted to volume fraction, $PI_{vol}$, using the density of each component. The $PI_{vol}$ was determined by converting the $PI_{mass}$ obtained from Equation 1. The adjusted SEM porosity ($\phi_{Adj\ SEM}$) was determined using Equation 7b.

In FIG. 4, a larger difference in $\phi_{GRI}$ and $\phi$*Adj SEM* was observed compared to FIG. 3. The SEM, pyrolysis, and GRI samples were not acquired as closely together as in FIG. 3, nor were they collected at the same time. The inconsistent sampling appears to have reduced the agreement between $\phi_{Adj\ SEM}$ and $\phi_{GRI}$. Despite this, the value of $PI_{vol}$ calculated from pyrolysis data using the equations provided above on each of the 7 samples (average value of 0.52 for $PI_{vol}$) and values of the sample correction factor A, of 1, 1, 0, 0, 1, 2 and 2 from left to right, the SOM-corrected SEM porosity ($\phi_{Adj\ SEM}$) showed better agreement with $\phi_{GRI}$ than was observed between $\phi_{GRI}$ and $\phi_{SEM}$.

Therefore, FIG. 4 lends credence to the appropriateness of the methods disclosed herein for correcting of non-cleaned rock samples for SEM imaging having SOM-containing pores using pyrolysis data from non-cleaned rock samples.

Example 2: Comparison of Adjusted Organic Matter

Figure 5:
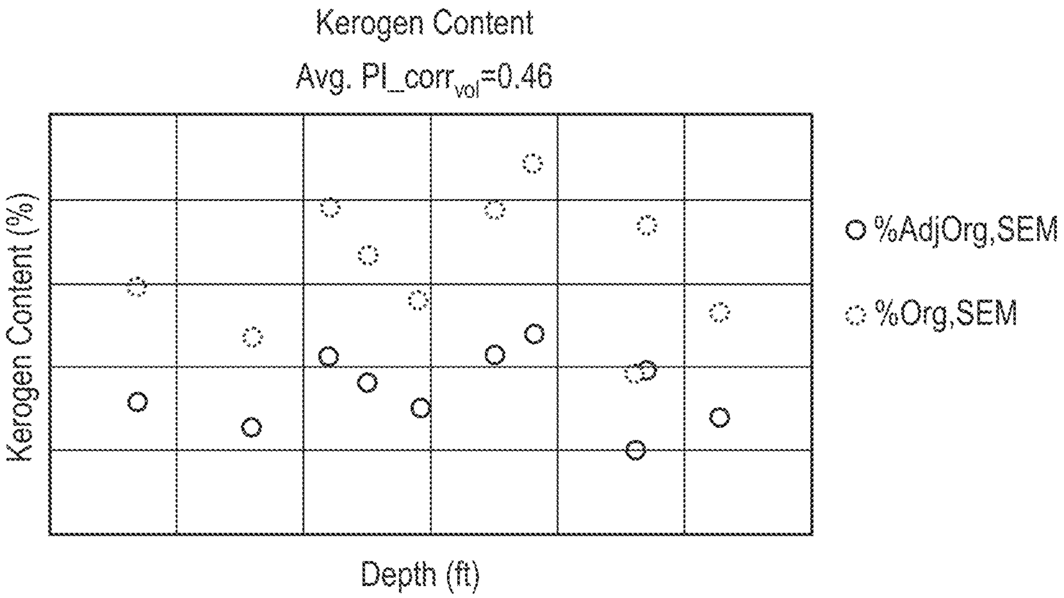
FIG. 5 is a graph comparing kerogen content values.

FIG. 5 shows the SEM organic matter content ($\%_{Org\ SEM}$) and adjusted SEM organic matter content ($\%_{AdjOrg\ SEM}$) for the samples in Example 1A. The corrected PI ($PI\_corr_{mass}$) was measured from HI obtained from cleaned samples as shown in Equation 3 and converted to $PI\_corr_{vol}$ for use in Equation 8a. The $PI\_corr_{vol}$ was determined as provided above for each sample (same as that used for FIG. 3 with an average $PI\_corr_{vol}$ of 0.46). Therefore, FIG. 5 demonstrates that the amount of organic matter determined from non-cleaned samples used for SEM imaging can be separated between that from SOM and that from insoluble organic matter (i.e., kerogen) using pyrolysis data from cleaned samples.

FIG. 5 lends credence to the appropriateness of the methods disclosed herein for correcting of non-cleaned rock samples using Equation 8a under appropriate circumstances.

What is claimed:

1. A method of determining an adjusted porosity of a source rock sample, the source rock sample comprising pores that contain soluble organic matter (SOM), the method comprising:

obtaining a scanning electron microscopy (SEM) image of the source rock sample;

obtaining pyrolysis data from the source rock sample; and using the pyrolysis data from the source rock sample to correct porosity data obtained from the scanning electron microscopy image of the source rock sample ($\phi_{SEM}$) to determine the adjusted porosity ($\phi_{Adj\ SEM}$) of the source rock sample, wherein the pyrolysis data comprises at least one member selected from the group consisting of a volume productivity index ($PI_{vol}$) of the source rock sample and a corrected volume productivity index ($PI\_corr_{vol}$) of the source rock sample; and wherein obtaining the pyrolysis data comprises heating the source rock under an increasing temperature ramp from 300-600° C.

2. The method of claim 1, wherein:

before obtaining the pyrolysis data, the source rock sample is not cleaned using a solvent; and the pyrolysis data comprises $PI_{vol}$.

3. The method of claim 2, wherein $$PI_{vol} = \frac{PI_{mass}/\rho_{SOM}}{(PI_{mass}/\rho_{SOM}) + ((1 - PI_{mass})/\rho_k)};$$

$PI_{mass}$ is the productivity index;

$\rho_{SOM}$ is the SOM density; and $\rho_k$ is the kerogen density.

4. The method of claim 2, wherein:

$$\phi_{Adj\,SEM} = \%_{org,SEM} * PI_{vol} + \phi_{SEM} + A;$$

$\%_{org,SEM}$ is an organic matter content calculated from the SEM image;

$\phi_{SEM}$ is a porosity determined from the SEM image; and

A is a correction factor.

5. The method of claim 1, wherein:

before obtaining the pyrolysis data, the source rock sample is cleaned using a solvent; and the pyrolysis data comprises $PI\_corr_{vol}$.

6. The method of claim 5, wherein $$PI\_corr_{vol} = \frac{PI\_corr_{mass}/\rho_{SOM}}{(PI\_corr_{mass}/\rho_{SOM}) + ((1 - PI\_corr_{mass})/\rho_k)};$$

$$PI\_corr_{mass} = -0.156 \times LN(HI) + 1.104;$$

HI is the hydrogen index;

$\rho_{SOM}$ is the SOM density; and $\rho_k$ is kerogen density.

7. The method of claim 5, wherein:

$$\phi_{Adj\,SEM} = \%_{org,SEM} * PI_{corr_{vol}} + \phi_{SEM} + A;$$

$\%_{org,SEM}$ is an organic matter content calculated from the SEM image;

$\phi_{SEM}$ is a porosity determined from the SEM image; and

A is a correction factor.

8. The method of claim 1, wherein:

the source rock sample comprises a first subsample and a second subsample;

the SEM image of the source rock sample is obtained from the first subsample; and the pyrolysis data is obtained from the second subsample.

9. One or more non-transient machine-readable hardware storage devices comprising instructions that are executable by one or more processing devices to perform operations comprising the method of claim 1.

10. A system comprising:

one or more processing devices; and one or more machine-readable hardware storage devices comprising instructions that are executable by the one or more processing devices to perform operations comprising the method of claim 1.

11. The method of claim 1, wherein the SEM image is obtained using two-dimensional scanning electron microscopy (2D SEM) or three-dimensional focused ion beam scanning electron microscopy (3D FIB-SEM).

12. The method of claim 1, wherein the SEM image comprises a member selected from the group consisting of small field of view (FOV) 2D images, high resolution large FOV (LgFOV) stitched images, and 3D image volumes.

13. The method of claim 1, wherein the SEM image is segmented to identify and label component groups present in the image.

14. The method of claim 13, wherein the segmenting method is selected from the groups consisting of intensity-based thresholding, gradient thresholding, watershed, and machine learning methods.

15. The method of claim 1, wherein the source rock sample is crushed to a size of less than 500 μm prior to obtaining the pyrolysis data.

16. The method of claim 1, wherein the source rock sample is from an unconventional reservoir.

17. A method of determining an adjusted porosity of a source rock sample, the source rock sample comprising pores that contain soluble organic matter (SOM), the method comprising:

obtaining a scanning electron microscopy (SEM) image of the source rock sample;

obtaining pyrolysis data from the source rock sample; and using the pyrolysis data from the source rock sample to correct porosity data obtained from the scanning electron microscopy image of the source rock sample ($\phi_{SEM}$) to determine the adjusted porosity ($\phi_{Adj\ SEM}$) of the source rock sample, wherein the pyrolysis data comprises at least one member selected from the group consisting of a volume productivity index ($PI_{vol}$) of the source rock sample and a corrected volume productivity index ($PI\_corr_{vol}$) of the source rock sample; and wherein the source rock sample is crushed to a size of less than 500 μm prior to obtaining the pyrolysis data.

* * * * *